June 20, 1961 F. SOUTHALL 2,989,339
DETACHABLE RAINSHIELD FOR AUTOMOBILE WINDSHIELDS
Filed April 21, 1960

INVENTOR
FRED SOUTHALL

BY
ATTORNEYS

United States Patent Office 2,989,339
Patented June 20, 1961

2,989,339
DETACHABLE RAINSHIELD FOR AUTOMOBILE WINDSHIELDS
Fred Southall, 9310 N. Willow St., Tampa, Fla.
Filed Apr. 21, 1960, Ser. No. 23,709
2 Claims. (Cl. 296—95)

This invention relates to detachable rainshields for automobile windshields and more particularly to a rainshield adapted to be located over the windshield area for protecting it from rain which might interfere with the vision of the occupants of the automobile when viewing a drive-in movie.

An important object of this invention is the provision of a rainshield of the above nature which may be easily and quickly mounted upon the roof of an automobile by the use of novel attachment tabs.

Another object of this invention is the provision of a readily detachable rainshield which may be mounted upon an automobile roof without the danger of damaging or injuring the painted surface of the automobile in any way.

Even another object of this invention is the provision of an automobile rainshield which will form an effective seal between a portion of the rainshield and the automobile roof.

A further object is the provision of a rainshield of this nature which will be of a simple one-piece construction with the attendant low cost of manufacture.

A still further object is the provision of a detachable rainshield which is light in weight, easy to install and manipulate and which may be easily stored in the trunk of an automobile. These and other objects and advantages of the invention will become apparent from the following specification and drawing wherein like numerals refer to similar parts throughout.

Basically, the detachable rainshield is a one-piece device comprising a generally rectangular sheet made of polyethylene or like material having a pair of integral, oppositely disposed attachment tabs.

Figure 1:
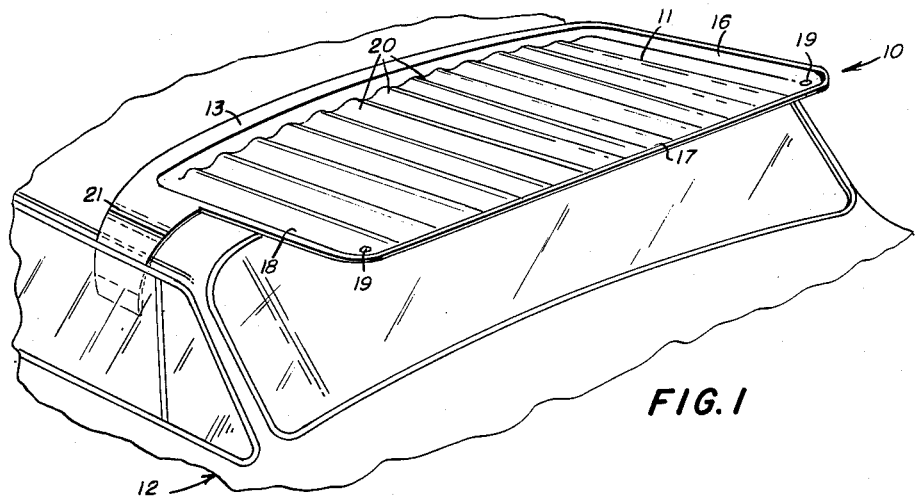
FIG. 1 is a perspective view of the detachable rainshield showing the same in use over the windshield of an automobile.
Figure 2:
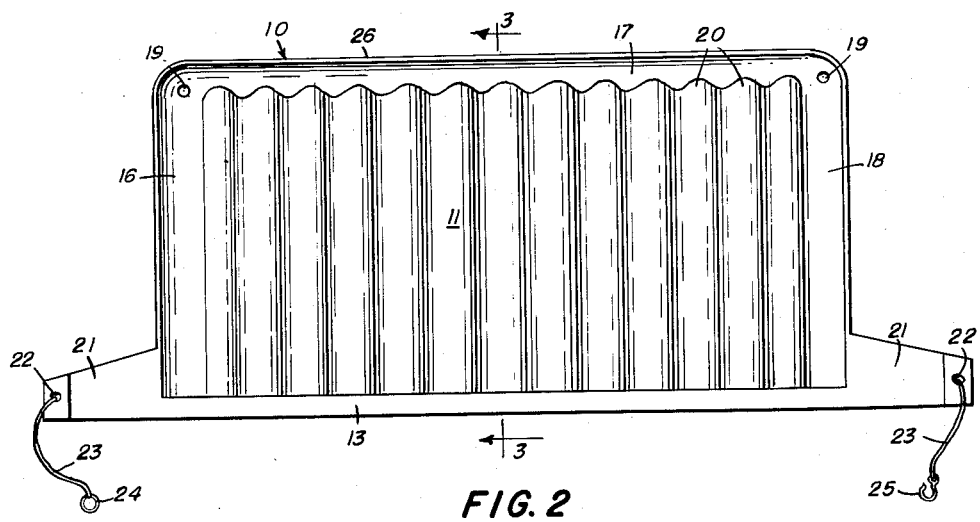
FIG. 2 is a top or plan view of the rainshield showing the attachment tabs in an extended position.
Figure 3:
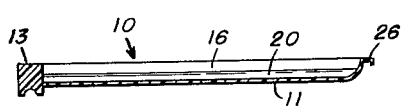
FIG. 3 is a cross-section taken along the lines 3—3 of FIG. 2.
Figure 4:
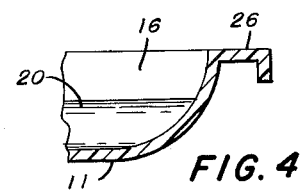
FIG. 4 is an enlarged fragmentary sectional view of the upturned edge of the rainshield as shown in FIG. 3.
Figure 5:
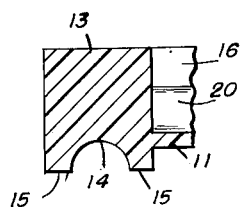
FIG. 5 is an enlarged sectional view of the integral sealing member shown in FIG. 4.

Referring in detail to the drawings and more particularly to FIGS. 1 and 2, the detachable rainshield, generally designated as 10, is shown to comprise a sheet 11 extending over the windshield of an automobile designated as 12. The sheet 11 is formed or molded to provide an integral member or sealing bar 13 which extends along one of the long edges of the sheet. The bar 13 is generally square in cross-section and it is integrally joined with the sheet 11 along the lower portion of its inward side as best shown in FIG. 3. The roof contacting side of the sealing bar 13 has the groove 14 separating a pair of sealing projections 15. These projections act as a seal which prevents rainwater from running between the sheet 11 and the roof of the automobile 12. The polyethylene material which is used to form the rainshield is sufficiently stiff so that the sheet will extend over the windshield area without substantial downward deflection. However, the material is flexible enough to permit the rearward portion of the sheet 11 and the bar 13 to conform to the contour of an automobile roof. In this manner, the projections 15 are adapted to act as a double seal between the sheet 11 and the roof of the automobile 12. The groove 14 permits the projections 15 to more readily conform to the roof contour thus forming an effective seal.

Referring again to FIGS. 1 and 2, it will be seen that the other edges 16, 17 and 18 are upturned to form a continuous lip. The rainshield is thus shaped in a fashion similar to a pan. It has the continuous lip along three of its edges and bar 13 along its fourth edge. The lip is further formed by the downwardly extending right angle flange 26 which continuously extends along these three upturned edges. The upturned edges serve the twofold purpose of adding rigidity to the sheet 11 and acting as a means to withhold water from dripping over the outer edges of the sheet. Rainwater collected on the upper surface of the rainshield 10 is permitted to drain through the pair of drain holes 19. The holes 19, disposed in the forward corners of the rainshield, permit the water to be drained in an area that will not obscure the vision of the occupants of the vehicle. Additional rigidity is given to the sheet 11 along its width by means of the corrugations 20.

The attachment means for the detachable rainshield comprise a pair of oppositely disposed tabs or flaps 21 shown in plan view in FIG. 2. The tabs 21 are integrally formed with the sheet 11 and extend at right angles from the extremities of the upturned lips 16 and 18. The rearward edge of the tabs 21 is flush with the rearward side of the bar 13 and acts as an extension of the same. The tabs are adapted to be frictionally engaged between the door and door frame of an automobile and they are sufficiently thin to be readily flexed or deformed by the hand of a person. The extremities of the tabs 21 have the eyelets 22 mounted therein. The eyelets are adapted to receive any conventional securing means such as the elastic cords 23 having the ring 24 and the hook 25 attached thereto.

The rainshield is attached to an automobile as follows: The device is extremely light in weight and it is easily placed in a near horizontal position upon the roof of the automobile near the windshield area. The surface of most drive-in movie theaters is graded so that the automobile will be parked on a slight incline. The horizontal or near horizontal position of the rainshield can be maintained by disposing the same in a more forward location on the automobile roof near the windshield where the longitudinal curvature of the roof is the greatest. After the rainshield has been located in the desired position the front side doors of the automobile are opened and the tabs 21 are inserted into the door space and drawn or pulled toward each other under the forward portion of the automobile roof. The tabs can be easily pulled by hand and only a moderate amount of pulling force is necessary to draw the projections 15 of the bar 13 into sealing engagement with the automobile roof. The rainshield is held in position by simply closing the automobile doors on the tabs 21 as they are held in place by the occupants of the automobile. Thus, the rainshield is supported as a cantilever. Its rearward portion rests on the automobile roof and it is held in place by the downward force of the attachment tabs. The free ends of the tabs 21 can be urged towards each other by connecting the optional equipment comprising the ring 24 and the hook 25 of the elastic cords 23. This may be done depending on whether it is desired to hold the rainshield in place during the opening of the car doors. The elastic cords 23 have sufficient tension to hold the rainshield in place and in sealing engagement with the automobile roof. It is readily apparent that the rainshield can also be attached by inserting the tabs 21 through the open window space in the side doors and then connecting the elastic cords 23 as described above.

The rainshield may easily be stored in an automobile trunk compartment by folding the tabs 21 over the sheet 11 which has a length less than the width of the automobile.

Thus, it can be readily seen from the above description and drawing that my invention discloses a novel automobile rainshield which is inexpensive to manufature and which can be easily attached to the roof of an automobile. It forms an effective seal and prevents any rainwater from running onto the windshield which might interfere with the vision of the occupants of the automobile.

It is to be understood that the embodiment shown is for the purpose of example only and is not to be taken as the sole form of this invention, in that other embodiments and modifications thereof will fall within the scope of the appended claims.

Having thus fully described the invention, what is claimed as new and for which it is desired to secure Letters Patent is:

1. A rainshield for use upon an automobile comprising a generally rectangular sheet of relatively stiff material adapted to project over an automobile windshield and integral attachment means for supporting said rainshield in place, said sheet having an integral sealing member extending along its rearward edge and an integral upturned lip extending along its other three edges, said sealing member being generally square in cross-section and having a centrally disposed groove in its roof engaging surface separating a pair of sealing projections, said projections adapted to conform to the contour of the exterior lateral portion of an automobile roof near its windshield for sealing engagement therewith, said attachment means comprising a pair of oppositely disposed tabs, said tabs extending horizontally at right angles from the portion of said upturned lips continguous with the rearward corners of said sheet, said tabs having sufficient flexibility to permit frictional engagement between the door and door frame of an automobile.

2. The rainshield according to claim 1 wherein the free ends of said attachment tabs have connection means secured thereto, said connection means being engagable for urging the free ends of said tabs toward each other under the forward portion of an automobile roof.

References Cited in the file of this patent

UNITED STATES PATENTS

| | | |
|---|---|---|
| 685,265 | Doe | Oct. 29, 1901 |
| 1,556,902 | Beville et al. | Oct. 13, 1925 |
| 2,065,242 | Omerly | Dec. 22, 1936 |
| 2,624,406 | Szychowski et al. | Jan. 6, 1953 |
| 2,633,381 | Francis | Mar. 31, 1953 |
| 2,783,082 | Genua | Feb. 26, 1957 |
| 2,843,421 | Shelton | July 15, 1958 |